July 30, 1929. R. K. BARRY ET AL 1,722,263
HARDNESS TESTING MACHINE
Filed Sept. 10, 1924   3 Sheets-Sheet 2

Inventors
Robert K. Barry
Leonard Brown
By Alexander Sowll
Attorney

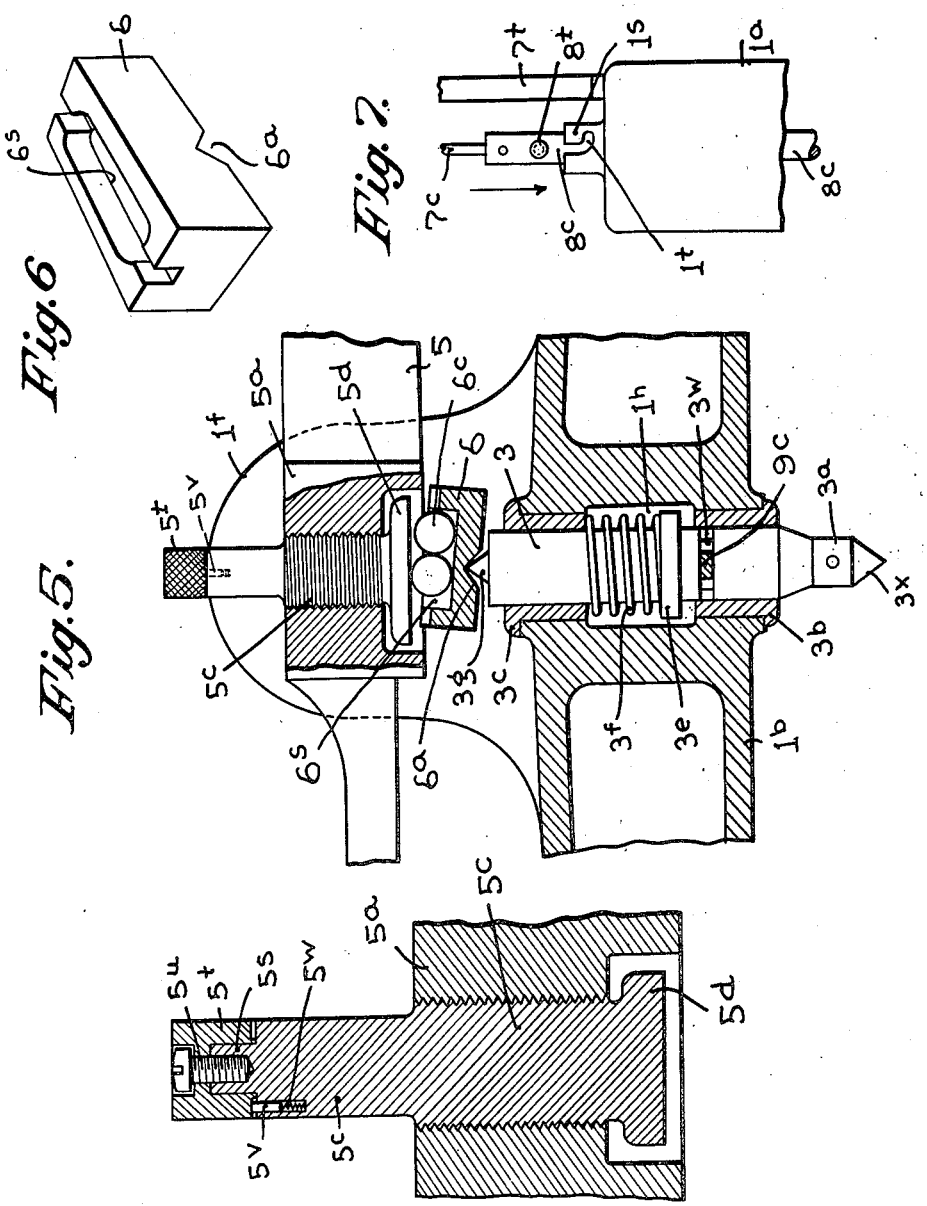

Patented July 30, 1929.

1,722,263

UNITED STATES PATENT OFFICE.

ROBERT K. BARRY AND LEONARD BOWEN, OF MUSCATINE, IOWA.

HARDNESS-TESTING MACHINE.

Application filed September 10, 1924. Serial No. 736,877.

This invention is a novel machine for testing the hardness of objects of various kinds of material. The object of the invention is to provide a machine which will always be 5 uniform in its operation; and will apply the load or pressure to the object gradually and with absolute uniformity both of pressure and in the period of time required to apply such pressure. Further objects are to 10 provide a machine in which the load will be applied by means of a pendulum weight; and to control the movement of the pendulum weight in applying the load by a cylinder and piston insuring absolute uniformity in 15 the movement of the pendulum in applying the load. Other minor objects and advantages of the invention will be hereinafter set forth.

We will explain the invention with reference to the accompanying drawings, which illustrate one practical testing machine embodying the invention, and in the claims following the description are summarized the essentials of the invention and the novel features of construction and novel combinations of parts for which protection is desired.

In the drawings:

Figure 4 is a detail view showing the means for operating the contact screw.

Figure 5 is a detail transverse sectional view on the line 5—5, Fig. 3.

Figure 6 is a detail view of the bearing block detached.

Figure 7 is a detail view showing the catch for the piston.

Figure 8 is a detail view of the piston.

Figure 1:
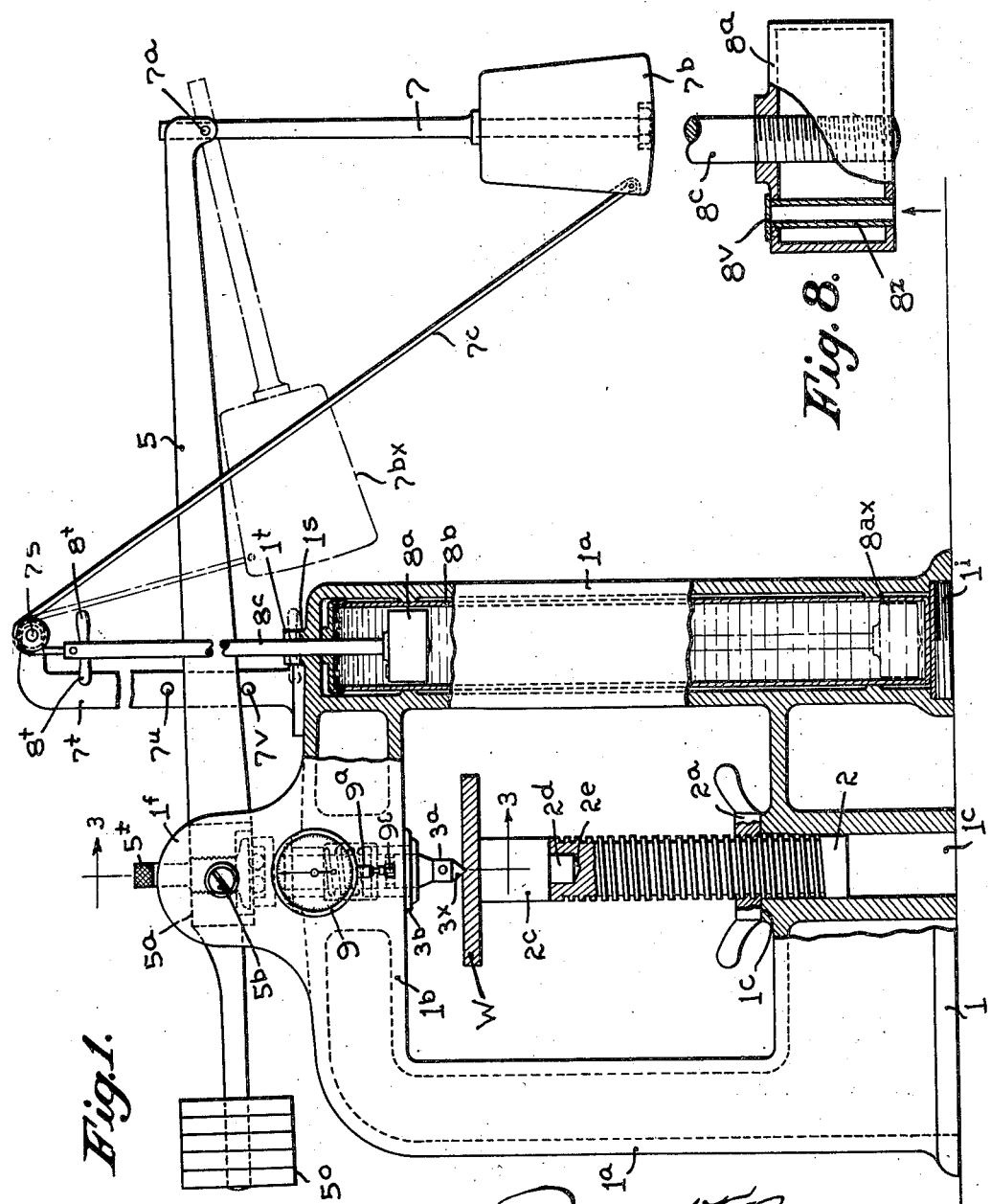
Figure 1 is a side elevation of the complete machine, indicating in dotted lines the position of the parts in position to begin the testing of an object, and in full lines the position of the parts assumed at the completion of the testing of the object.

The machine as shown in the drawings comprises a main frame having a base 1, from which rise uprights 1$^a$ connected by a top member 1$^b$; these parts may be of any desired size and form and formed integrally or separately and united, to form a strong, substantial main frame.

In the base 1 and beneath the top member 1$^b$, and in line therewith, is a vertical core 1$^c$, which acts as a guide for an adjustable shaft 2, which supports the object to be tested during the testing operation. The shaft 2 can be threaded and be raised or lowered by a handwheel nut 2$^a$ engaging threads of the shaft and resting upon the base 1$^c$, so as to support the shaft thereon. The lower portion of the shaft 2 engaging the core 1$^c$ serves to guide the shaft and keep it truly positioned; and by turning the handwheel-nut 2$^a$, the shaft 2 can be raised or lowered; anvil or work support 2$^c$ may be placed on top of the shaft 2; and in the example shown, the anvil 2$^c$ has a centering stud 2$^d$ on its lower end, engaging an axial socket 2$^e$ in the upper end of the shaft 2. Sets of interchangeable blocks 2$^c$ may be provided, any one of which may be used.

The object W to be tested could be supported directly upon the shaft 2, as is obvious, but by using the anvil blocks, less adjustment of the shaft 2 is required: but we do not consider the invention restricted to these adjustable work-supporting devices shown. By "work" we refer to the object to be tested, whatever may be its form or material, such object illustrated at W in the drawing.

Mounted in and depending from the top bar 1$^b$ is a plunger 3, which is guided in a vertically disposed socket 1$^h$, within the top member 1$^b$, said socket being so disposed that the plunger is in axial alignment with the screw 2. This plunger projects below the top bar 1$^b$, and has attached to its lower end a chuck 3$^a$, preferably screwed on the end of the plunger, as indicated, said chuck being provided with a penetrator point 3$^x$, which may be a diamond or formed of some other suitable material capable of withstanding pressures greater than the maximum pressure which the machine can exert on the said point in testing an object.

The plunger 3 may be guided at its upper end by a collar or bushing 3$^c$ secured in the upper end of the bore 1$^h$, and at its lower end by a similar bushing 3$^b$. The plunger has an annular flange 3$^e$, above the bushing 3$^b$, and a coiled spring 3$^f$ is interposed between the top of flange 3$^e$ and the bushing 3$^c$, and normally depresses the plunger.

Figure 3:
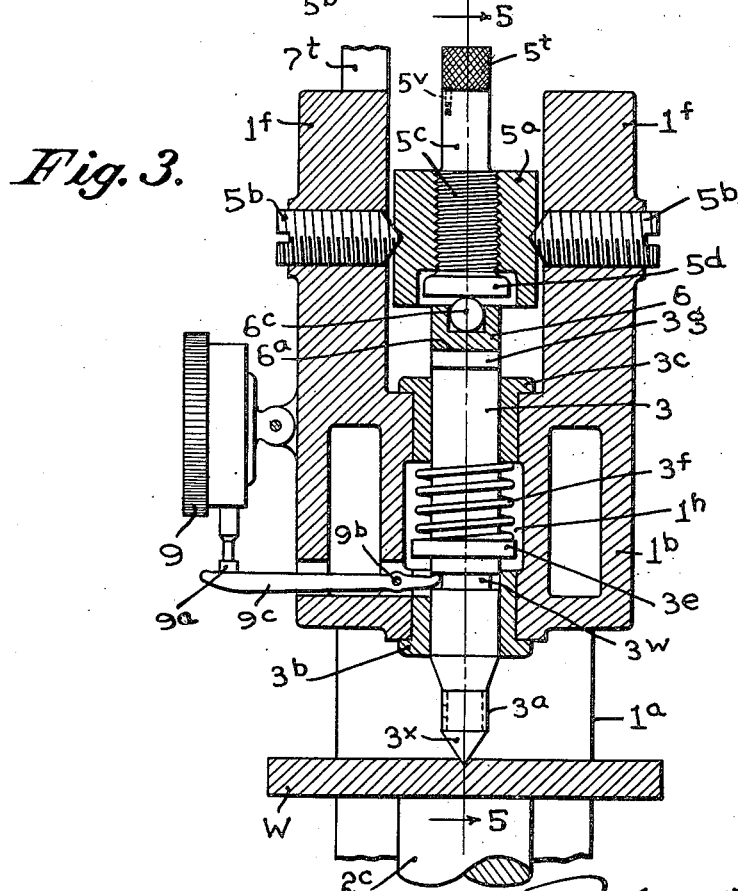
Fig. 3 is an enlarged sectional view on the line 3—3, Fig. 1.

The upper end of the plunger projects above the bushing 3$^c$, and has on its upper end a knife edge fulcrum 3$^g$ (see Fig. 3), and pressure is applied on this fulcrum from pressure lever 5, hereinafter referred to: which pressure lever is fulcrumed between lugs 1$^f$ on the top bar 1$^b$.

Preferably lever 5 has a head or enlargement 5ᵃ which is fulcrumed by and between conically-pointed pivot screws 5ᵇ, tapped through the lugs 1ᶠ and engaging opposite sides of the head 5ᵃ. The underside of head 5ᵃ may contact directly with the fulcrum point 3ᵍ on the plunger 3; but to avoid possible friction, and also to overcome any side thrust upon the fulcrum 3ᵍ, a rock plate 6 is interposed between the lever 5 and the plunger, said rock plate being provided on its under side with a V-shaped recess 6ᵃ, slightly more obtuse in angularity than the fulcrum 3ᵍ, so that there will be no lateral pressure between the knife edge and the recess 6ᵃ. The upper side of this rock plate 6 might contact directly with the under side 5ᵃ of the lever 5, but preferably the rock plate engages the head 5ᵈ of a contact screw 5ᶜ tapped through head 5ᵃ; and the screw head 5ᵈ occupying a recess in the under side of the head 5ᵃ (see Fig. 3).

To obviate any friction, a slot or recess 6ˢ is formed in the top of the rock-plate for the reception of an anti-friction means of any suitable kind. In the drawings hardened rollers or balls 6ᶜ are interposed between the rock plate 6 and head 5ᵈ of contact screw 5ᶜ; and these balls obviate any possible friction between the lever and the rock plate, at the only point where there is any possibility of such variation in friction as might otherwise interfere with the absolute accuracy of the apparatus.

Preferably the fulcrum recess 6ᵃ on the rock plates 6 is off center (see Fig. 5) so that the right hand end of the block would naturally tend to drop by gravity, if there is no pressure against the block: the balls 6ᶜ naturally gravitate toward the right hand end of the block, when the head 5ᵈ of the contact screw is free from the balls, or retracted so as to permit the rock plate 6 to tilt to the right. When the contact screw is turned down, however, its head 5ᵈ first engages the left hand ball and the block is returned to horizontal position until both balls engage the face of the head 5ᵈ of the screw. The slot 6ˢ is so long that a space is provided between the left ball and left end of the slot in the block, so that balls can move towards the left when the main lever 5 swings down around its center.

Preferably the upper end of the contact adjusting screw 5ᶜ is provided with a round knurled hand or ratchet cap 5ᵗ, similar to the ratchet nuts or caps used on ordinary micrometers. As indicated in Figure 4 the cap 5ᵗ is rotatably screwed on a stud 5ˢ, on the upper end of the screw 5ᶜ, by means of a screw 5ᵘ, and the under side of this nut is ratcheted and engages with a spring pressed detent pin 5ᵛ confined in a socket in the end of the screw 5ᶜ; the ratchet pin 5ᵛ being pressed outward by spring 5ʷ having sufficient resistance to enable the operator to turn the screw 5ᶜ up or down by turning the cap 5ᵗ; but the cap will turn on screw 5ᶜ when the resistance of the spring 5ʷ is overcome. We preferably use this kind of a ratchet cap so that when turning down the contact screw to bring its face against the balls there will be no tendency to force undue pressure on the plunger 3ᵈ as the ratchet cap 5ᵗ will slip as soon as the face 5ᵈ of the contact screw 5ᶜ tips up the block or rock plate 6 and engages balls 6ᶜ.

It should be noted that the axes of the screws 5ᵇ which form the fulcrum of the lever 5, are slightly to one side of the axis of the contact screw 5ᶜ and plunger 3; consequently any weight applied to the outer end of the lever 5 will, through the connection described, tend to depress the plunger 3 and apply pressure direct to the object W resting on the anvil 2ᶜ. The length of the lever 5, the size of the weight applied to the end of such lever: and the proportionate distances between the fulcrum of the lever and the axis of the screw 5ᶜ, determines the extent of augmentation of the pressure produced by the weight on the lever, when applied to the object.

In the present invention, a pendulum weight is connected to the outer end of the lever 5, said weight comprising a bar 7, pivoted at 7ᵃ to the outer end of the lever 5, and said rod having a weight 7ᵇ, attached to its free end. The pendulum weight can be swung up parallel with the lever 5 as indicated in dotted lines 7ᵇˣ in Fig. 1, and can be held in this position by any suitable means while the object is being adjusted on the support, preparatory to testing the same.

As shown, pendulum 7ᵇ is connected by an adjustable cable 7ᶜ to a piston rod 8ᶜ connected to a piston 8ᵃ in a cylinder 8ᵇ, which is vertically disposed and may be conveniently located within one of the adjacent side members 1ᵃ of the main frame. The rod 8ᶜ may be guided in suitable openings in the upper end of the cylinder 8ᵇ and top of the frame, as indicated in the drawings, so that the piston 8ᵃ may move vertically. The cylinder 8ᵇ may be secured in the frame by any suitable means; as shown, it is entered into one of the uprights through an opening in the base of the frame, which opening may be closed by a removable threaded disk 1ⁱ.

For convenience the rod 8ᶜ is provided with a handle piece 8ᵗ by which the rod and piston may be forced down to raise the swinging pendulum up as indicated in dotted lines in Figure 1. The parts may be retained in this position by any suitable devices. As shown in Figures 1 and 7, when the piston rod is fully depressed the handle 8ᵗ may be engaged with a slot 1ᵗ formed in a collar 1ˢ surrounding the opening through which the piston rod 8ᶜ extends. Any other suitable detent might be used.

If desired the piston may be provided with a fluid passage indicated at 8ˣ in Fig. 8, the upper side of which could be closed, with a lever flap valve 8$^v$ which valve would close when the piston was raised but would open as the piston was pushed down and thus make it easier to lower the piston and raise the pendulum weight.

The cable 7$^c$ may run over a pulley 7$^s$ mounted on a bracket 7$^t$, on the top of the main frame, as indicated in the drawings; and to the bracket 7$^t$ may be attached upper and lower stop pins 7$^u$, 7$^v$, respectively above and below the lever 5, to limit the movements of said lever.

The lever 5 may be provided with a projection on which may be mounted a weight 5$^o$ which may be so adjusted as to counterbalance the lever 5 when the pendulum weight 7$^b$ has been raised to the position indicated in dotted lines 7$^{bx}$ in Fig. 1. When the pendulum is lowered to the position shown in full lines in Fig. 1, the effect of the counterbalance weight is negligible, and it does not have to be considered in computing the total pressure applied to the object.

When the weight 7$^b$ is raised to the position shown in dotted lines 7$^{bx}$, Fig. 1, the piston 8$^a$ would be at its lowermost position, as indicated at dotted lines, 8$^{ax}$, Fig. 1; and the piston rod 8$^c$ can be held in such tension by a suitable catch so as to hold weight 7$^b$ in its raised position while an object W is being adjusted for test between the anvil 2$^c$, and the diamond point 3$^x$.

When the pendulum weight 7$^b$ is raised to the position shown in dotted lines in Fig. 1, it is obvious that it has very little effect upon the lever 5, the weight 7$^b$ being then principally supported by the cable 7$^c$; lever 5 is now against upper stop pin 7$^u$ having been tilted to this position by the lowering of the piston rod 8$^c$ and the action of the counter weight 5$^o$. (To understand placing of work see 1—2 and 3 under operation). Then the pendulum is released and swings by gravity to the position shown in full lines in Fig. 1, and as it thus moves its weight is increasingly applied to the end of the lever 5 at the pivot 7$^a$.

The weight applied to the contact screw 3$^c$ through the lever 5 increases as the pendulum swings down; and the pendulum applies its weight gradually and uniformly to the lever 5, and through said lever and contact screw 5$^c$ to the plunger 3. The time required for the downward swing of the pendulum is rendered uniform by the action of the plunger 8$^a$ in cylinder 8$^b$. The weights of the piston 8$^a$ and the cable 7$^c$ being practically negligible, and being always the same, do not have to be taken into consideration in calculating the pressure applied by the apparatus. As the weight descends it must draw the plunger up in the cylinder; and the rise of the plunger is determined uniformly and exactly by the extent of the opening provided (either by openings in the plunger, or the space between the sides of the plunger and the wall of the cylinder) for the passage of fluid from above the piston to below the piston; the piston and cylinder acting as a liquid dashpot to uniformly regulate the downward travel of the pendulum weight 7$^b$. Therefore, the pendulum weight must and will require exactly the same length of time for its downward movement each time the device is used, regardless of the nature of hardness of the object W being tested. The piston 8 can only move upwardly at a certain given rate controlled by the escape of fluid from above the piston to below the same.

The rocking plate 6 and the balls 6$^c$ interposed between the knife bearing 3$^g$ and the head of the lever 5 practically eliminate all appreciable friction between the lever and the plunger; so that such friction does not have to be considered in calculating the amount of pressure actually applied by the machine.

In every instance, the amount of pressure applied by this machine will be exactly the same, and the time required for the application of the pressure from the start of the operation, when the weight is released from its raised position until it reaches its lowest position, is exactly the same, regardless of the relative hardness of the different objects being tested; and this uniformity is a most important feature, as if there is variation in the time of application of pressure in testing similar objects, the extent of penetration of the diamond point into such object (even of exactly the same hardness) would vary in proportion to the variation in the time required for the application of such pressure; whereas with an absolutely uniform time for the applications of pressure, there can and will be no variation in the extent of penetration into objects of exactly the same hardness.

If accurate testing is desired it is absolutely essential that the load be applied in exactly the same time for every test; a variation in time of one second will cause an error in the reading. In our machine, the pendulum, which is the load, travels through it arc or completes its work in exactly the same number of seconds every time; as the pendulum movement downward is dependent upon the passage of the oil past or through the piston, a condition which can not vary and will be always the same.

We provide an indicator dial 9, attached to the member 1, and operatively actuated by or from the plunger 3, by suitable means; so that the extent of penetration of the diamond point 3$^x$ into an object can be readily noted by glancing at the dial.

Figure 2:
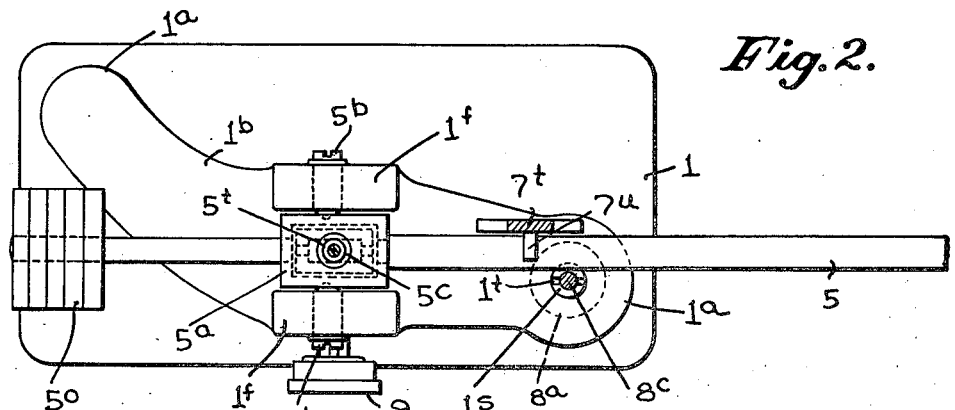
Fig. 2 is a detail top plan view.

The indicator 9 (Figures 1, 2 and 3) is of a well known type and is shown as attached to the side of the top member 1$^b$ adjacent the plunger 3. The indicator has a spindle 9$^a$ which is operatively engaged with the long arm of a lever 9$^c$ (Fig. 3) pivoted at 9$^b$ on the frame 1ᵇ, and the short arm of this lever extends through an opening in the frame and engages a notch 3ʷ in the plunger 3. The arms of the lever are so proportioned that a slight movement of the plunger 3 will impart the desired extent of movement to the spindle 9ᵃ.

When the piston rod 8ᶜ is depressed by bearing upon the handle 8ᵗ until the piston 8ᵃ is fully lowered, the pendulum weight 7ᵇ is raised nearly to lever 5. The counterweight 5° will then tilt the lever 5 to the left and raise it until it is arrested by contact with the upper stop 7ᵘ, and then the piston rod 8ᵗ is held in lowered position as above described. The parts are then ready for operation.

The contact screw 5ᶜ then will be turned back so as to raise the head 5ᵈ until it releases the pressure on the balls 6ᶜ. Then the plate 6 will tilt to the right slightly raising the left hand ball above the other ball. (See Fig. 5.) The handwheel 2ᵃ can then be turned until the work support is lowered sufficiently to permit a piece of work W to be inserted between the anvil 2ᶜ and the penetrator point 3ᵃ. Then the contact screw 5ᶜ is turned down thereby rocking plate 6 until both balls are in contact with the surface of head 5ᵈ. The work W, penetrator 3ˣ, knife bearing 3ᵍ, rock plate 6, balls 6ᶜ, head 5ᵈ of contract screw 5ᶜ and lever 5 are all in contact. At this time most of the weight of the pendulum 7ᵇ is suspended by the cable 7ᶜ and it is an advantage to have the pressure very gentle or light at the beginning of the operation. Then the piston rod 8ᶜ is released, and as the pendulum weight swings downward its weight is increasingly transferred from the cable to the lever. The fact that little pressure is applied to the point at the beginning of the operation increases the life of the penetrator point and enhances the efficient action of the device.

*Operation.*

(1). Place the object to be tested on anvil, at top of screw: (2). Turn hand wheel nut until test piece comes in contact with the diamond of ball penetrator on end of plunger, and keep turning hand wheel nut until the indicator hand is at zero. (3). Turn ratchet nut on top of contact screw until said nut slips. The face of the contact screw will then bear firmly against the two balls; the lever, plunger, penetrator, and piece being tested, are now in slight pressure contact. (4). Then release pendulum; pendulum will immediately begin to travel down through its arc. The counter weight prevents any sudden impact when the lock is released. As the pendulum travels down its weight is uniformly transferred from the cable to the lever; there is no sudden application of the load: As the load increases the penetrator sinks into the test piece. (5.) After pendulum has completed its downward movement and comes to rest in its vertical position, the hardness reading of value may be noted on the indicator dial; or a certain number of seconds may be allowed to elapse and the reading then taken. (6). Then force the piston rod down (which in turn raises pendulum and forces piston down in cylinder) until pendulum is raised to the position shown in dotted lines in Fig. 1, and then fasten it in raised position and release or turn up contact screw. Then turn hand wheel lowering work away from the penetrator. The machine is now ready for another operation.

The length of time in which full pressure is actually applied to the object W can be readily determined by the operator in various ways. In practice, the piston 8ᵃ is preferably made hollow so that it will tend to float; so that after the weight 7ᵇ has swung to a vertical position, as shown in full lines in Figure 1, the piston 8ᵃ will continue to rise a little higher, according to the fluid in the cylinder, and slacken the cable 7ᶜ. If the operator will note the first indication of slack in the cable, an exclusive feature, he will know that the weight has then reached its full limit, and the pressure of the penetrator on the object being tested is practically completed or he can allow this load to continue for any length of time if so desired, which procedure is unnecessary if the slack in the cable is observed, for this will occur always in the same time period; thus all objects are subjected to the pressure for the same length of time.

We claim—

1. In a testing machine, a work support; a penetrator; a pivoted lever adapted to depress the penetrator; a swingable weight pivoted on the lever and adapted when released to gradually and increasingly apply pressure to the penetrator; and means to control the decent of the weight in applying pressure.

2. In a testing machine for the purpose specified, a work support; a penetrator; a pivoted lever adapted to depress the penetrator; a pendulum weight pivoted on the lever and adapted when released to gradually and increasingly apply pressure to the penetrator; and a dash pot and connections to control the descent of the weight in applying pressure.

3. In a testing machine, a work support; a penetrator; a pivoted lever and connections for applying pressure to the penetrator; a swingable weight on the lever adapted to gradually and increasingly apply pressure to the penetrator, said connections including a contact screw adjustably carried by the lever, and a ball bearing contact interposed between said screw and the penetrator.

4. In a testing machine, a work support;

a penetrator; a pivoted lever and connections adapted to depress the penetrator; and a swingable weight on the lever and adapted to gradually and increasingly apply pressure to the penetrator, said connections including a rock plate; and balls interposed between said plate and the lever.

5. In a testing machine, a work support; a penetrator; a pivoted lever adapted to depress the penetrator, and a swingable weight on the lever adapted to gradually and increasingly apply pressure to the penetrator, a rock plate; balls interposed between said plate and the lever; and an adjustable contact screw connected to the lever and engaging the balls on said plate.

6. In a hardness tester, a work support, a plunger, a penetrator connected to the plunger; a pivoted lever adapted to engage and depress the plunger; and a swingable weight pivoted on the lever and adapted when released to gradually and increasingly apply pressure thereto as the weight swings downward.

7. In a hardness tester, a work support; a penetrator; a plunger for operating the penetrator; a pivoted lever adapted to engage the plunger and depress the penetrator, means adapted to gradually and increasingly apply pressure to the lever, a contact screw adjustably carried by the lever, and a ball bearing contact bearing on said screw and forming part of the connections to the penetrator.

8. In a hardness tester, a work support; a penetrator; a plunger for operating the penetrator; a pivoted lever, means adapted to gradually apply pressure to the lever, a rock plate pivotally mounted upon the plunger; and balls interposed between said plate and the lever; and an adjustable device connected to the lever and engaging the balls on said plate.

9. In a hardness tester, the combination of a frame; an adjustable work support; a penetrator adapted to contact with work on the support; a plunger carrying the penetrator; a lever pivoted above the plunger and adapted to depress the plunger; a swinging pendulum weight connected with the outer end of said lever and adapted to gradually and increasingly apply pressure thereto as the weight swings downward; and means for holding the weight in raised position while the work is being adjusted between the penetrator and support.

10. In combination with mechanism as set forth in claim 9, means whereby the descent of the weight is controlled.

11. In combination with the mechanism as set forth in claim 9, an adjustable contact screw connected with the lever, and ball bearings and a rock plate interposed between said screw and the plunger.

12. In mechanism as set forth in claim 9, a rock plate pivotally mounted upon the plunger; and balls interposed between said plate and the lever.

13. In combination with mechanism as set forth in claim 9, a rock plate pivotally mounted upon the plunger; and balls interposed between said plate and the lever; and an adjustable contact screw connected to the lever and engaging the balls on said plate.

14. In a hardness tester, the combination of a frame; an adjustable work supporting shaft; a penetrator above the shaft adapted to contact with work supported by the shaft; a plunger carrying the penetrator; a spring for normally raising the plunger; a lever pivoted above the plunger and adapted to depress the plunger; a swinging pendulum weight connected with the outer end of said lever and adapted to gradually and increasingly apply pressure as the weight swings downward; and means for normally holding the weight in raised position while the work is being adjusted beneath the penetrator.

15. In combination with mechanism as set forth in claim 14, means whereby the descent of the weight is controlled.

16. In combination with mechanism as set forth in claim 14, an adjustable contact device in the connections between the plunger and the lever.

17. In combination with the mechanism as set forth in claim 14, an adjustable contact screw connected with the lever, and ball bearings and a rock plate interposed between said screw and the plunger.

18. In mechanism as set forth in claim 14, a rock plate pivotally mounted upon the plunger; and balls interposed between said plate and the lever.

19. In mechanism as set forth in claim 14, a rock plate pivotally mounted upon the plunger; and balls interposed between said plate and the lever; and an adjustable contact screw connected to the lever and engaging the balls on said plate.

20. In mechanism of the character specified, the combination of a plunger having a knife bearing; a rock plate mounted on said bearing; a lever for operating the plunger; and an anti-friction device interposed between said lever and rock plate.

21. In mechanism of the character specified, the combination of a plunger having a knife bearing; a rock plate mounted on said bearing, and normally tiltable thereon; a lever for operating the plunger; and an adjustable contact screw tapped through said lever and having a head on its lower end operatively engaged with said plunger.

In testimony that we claim the foregoing as our own, we affix our signatures.

ROBERT K. BARRY.
LEONARD BOWEN.